(12) United States Patent
Zhu et al.

(10) Patent No.: US 9,123,122 B2
(45) Date of Patent: Sep. 1, 2015

(54) REMOVING AN OBJECT SUPPORT FROM IMAGING DATA

(75) Inventors: Yang-Ming Zhu, Solon, OH (US);
Steven M Cochoff, Hudson, OH (US);
Ronald Sukalac, Mentor, OH (US)

(73) Assignee: Koninklijke Philips N.V., Eindhoven (NL)

(*) Notice: Subject to any disclaimer, the term of this patent is extended or adjusted under 35 U.S.C. 154(b) by 367 days.

(21) Appl. No.: 13/813,706

(22) PCT Filed: Jul. 25, 2011

(86) PCT No.: PCT/IB2011/053306
§ 371 (c)(1),
(2), (4) Date: Feb. 1, 2013

(87) PCT Pub. No.: WO2012/017353
PCT Pub. Date: Feb. 9, 2012

(65) Prior Publication Data
US 2013/0127902 A1 May 23, 2013

Related U.S. Application Data

(60) Provisional application No. 61/370,230, filed on Aug. 3, 2010.

(51) Int. Cl.
*G06K 9/00* (2006.01)
*G06T 7/00* (2006.01)
*A61B 5/05* (2006.01)

(52) U.S. Cl.
CPC ............. *G06T 7/0083* (2013.01); *G06T 7/0097* (2013.01); *G06T 2207/10081* (2013.01); *G06T 2207/10104* (2013.01); *G06T 2207/20061* (2013.01); *G06T 2207/20148* (2013.01); *G06T 2207/30004* (2013.01)

(58) Field of Classification Search
USPC ......... 382/100, 103, 106–107, 128–134, 154, 382/162, 168, 173, 181, 193, 199, 219, 224, 382/232, 254, 274–276, 285–294, 305, 382/312; 378/4, 21; 600/407, 425
See application file for complete search history.

(56) References Cited

U.S. PATENT DOCUMENTS

| | | | |
|---|---|---|---|
| 2002/0009215 A1* | 1/2002 | Armato et al. | 382/131 |
| 2005/0113679 A1* | 5/2005 | Suryanarayanan et al. | 600/425 |
| 2009/0012382 A1* | 1/2009 | Dutta et al. | 600/407 |
| 2010/0128946 A1* | 5/2010 | Fidrich et al. | 382/131 |

OTHER PUBLICATIONS

Kim, J., et al.; Maximum intensity projection (MIP) visualization and navigation of fused PET/CT with automated bed/linen removal; 2007; J. Nucl. Med.; 48(Supplement 2):414P.

Kim, J., et al.; A fully automatic bed/linen segmentation for fused PCT/CT MIP rendering; 2008; J. Nucl. Med.; 49 (Supplement 1):387P.

(Continued)

*Primary Examiner* — Seyed Azarian

(57) ABSTRACT

A method and system for removing an object support from imaging data such as CT imaging data are provided. The automatic or semi-automatic removal process comprises identifying and locating the top edge of the object support in sagittal imaging plane data, and then removing the object support from transverse or volumetric imaging data.

27 Claims, 11 Drawing Sheets

(56) References Cited

OTHER PUBLICATIONS

Wen, L, et al.; A preliminary study on the knowledge-based delineation of anatomical structures for whole body PET-CT studies; 2008; IEEE Trans. on Technology and Applications in Biomedicine; pp. 112-115.

VivoQuant Manual: CT Tools: Bed Removal; last updated May 18, 2012 http://vivoquant.com/cgi-bin/manual.cgi?tools-bedremoval.html.

PET/CT Coregistration; Johns Hopkins Small Animal Imaging Resource Program/Data Analysis; updated 2012 http://sairp.rad.jhmi.edu/DataAnalysis/PETandCT%20Coregistration.doc.

Processing Mouse Hindlimb SPECT/CT Images; Jul. 2008; BioImage Suite; Section 25; Yale University School of Medicine; http://www.bioimagesuite.org/doc/node33.html.

\* cited by examiner

REMOVING AN OBJECT SUPPORT FROM IMAGING DATA

CROSS REFERENCE TO RELATED APPLICATIONS

This application is a national filing of PCT application Serial No. PCT/IB2011/053306, filed Jul. 25, 2011, published as WO 2011/017353 A1 on Feb. 9, 2012, which claims the benefit of U.S. provisional application Ser. No. 61/370, 230 filed Aug. 3, 2010, which is incorporated herein by reference.

The present application relates generally to the imaging arts and more particularly to a method and system for removing an object support from imaging data. The application subject matter finds particular use with transmission imaging systems, especially x-ray based systems such as computed tomography (CT) imaging systems, and will be described with particular reference thereto. However, transmission imaging systems employing the present invention can further be used in connection with other imaging systems, such as single-photon emission computed tomography (SPECT) or positron emission tomography (PET) imaging systems. These and similar imaging systems typically gather imaging data regarding an object, such as a human patient, which is disposed on an object support such as a couch or table.

In many image reconstruction, processing, analysis, and visualization applications, it is desirable and important to remove the object support from the imaging data. As one example, in three-dimensional visualizations such as digitally reconstructed radiographs (DRRs) or maximum intensity projections (MIPs), the object support can block the view of the imaged object's structure. Thus it may be advantageous to remove the object support from the imaging data in order to obtain a complete view of the imaged object.

Another situation where removal of the object support from imaging data may be desirable is radiation treatment planning. In that situation, the object support can adversely impact the radiation dose modeling because the object support used during the imaging scan may be different from the object support used during the radiation treatment. Thus it may be advantageous to remove the object support from the imaging data before using the imaging data to plan a radiation treatment. In a further embodiment, a digital object support may then be added to the imaging data to approximate the object support which will be used during radiation treatment, for more accurate planning.

As yet another example, in many cases CT imaging data may be combined or registered with one or more kinds of other imaging data such as SPECT, PET, or magnetic resonance (MR) imaging data. Often, the object support is not visible in the latter imaging modalities. As a result, the presence of the object support in the CT imaging data can adversely impact the registration of the two imaging data sets. Thus removal of the object support from the CT data before registration can improve the registration process.

Moreover, scatter correction used for PET imaging reconstructions often estimates the boundaries of the imaged object from CT imaging data. Very often, scatter correction algorithms operate on the imaging data corresponding only to the imaged object without the object support. Determination of such object boundary estimates may often be improved by removing the object support from the CT imaging data before estimating the imaged object boundaries.

Some "manual" methods are known for removing an object support from imaging data. In these approaches, a user manually interacts with a visual representation of the imaging data on a display to define the boundaries of the object support. The portions corresponding to the object support are then removed from the imaging data. In a simple manual method, often used in radiation treatment planning, the user defines a couch removal plane on a display. A computer then removes all the imaging data below the plane identified by the user, including the object support. This simple manual method does not work very well, unless the object support is flat on top. Moreover, manual methods are usually time consuming, have a low degree of reproducibility, and have an uncertain accuracy.

Other, "automatic" methods are known for removing an object support from imaging data. In these approaches, a computer algorithm is applied to the imaging data to define the boundaries of the object support for removal from the imaging data. These approaches typically apply some sort of model-based method for identifying the object support in the imaging data. Although sophisticated models can be employed, and the model database can be expanded, still the type(s) of object support which can be removed are limited by the model(s).

"Semi-automatic" methods for removing an object support from imaging data, involving a combination of manual and automatic method steps, are also possible. As one example, in order to decrease the computer processing time for applying a purely automatic model-based segmentation, a user may use a display to manually adjust the position of an object support mask to be relatively close to the real object support in the imaging data.

Each of these known prior methods has drawbacks. For example, they often rely on potentially inaccurate assumptions concerning the shape or structure of the object support, especially in transverse imaging planes. Similarly, many of these prior approaches often are not robust in applying to different imaging systems, due to different shape, structure, and other characteristics of the object supports in the different imaging systems.

According to one aspect of the present invention, an automatic or semi-automatic method for removing an object support from imaging data is provided. The method comprises identifying and locating the top edge of the object support in sagittal imaging planes, and then removing the object support from the transverse imaging planes. The present invention does not require any assumptions concerning the particular shape, structure, or other characteristics of the object support in the transverse imaging planes. However, such assumptions might nonetheless be made in accordance with the present invention, for example to speed up the computer processing time. A related system and apparatus for performing the inventive method is also provided.

Numerous additional advantages and benefits will become apparent to those of ordinary skill in the art upon reading the following detailed description of the preferred embodiments. The invention may take form in various components and arrangements of components, and in various process operations and arrangements of process operations. The drawings are only for the purpose of illustrating preferred embodiments and are not to be construed as limiting the invention.

Figure 9:
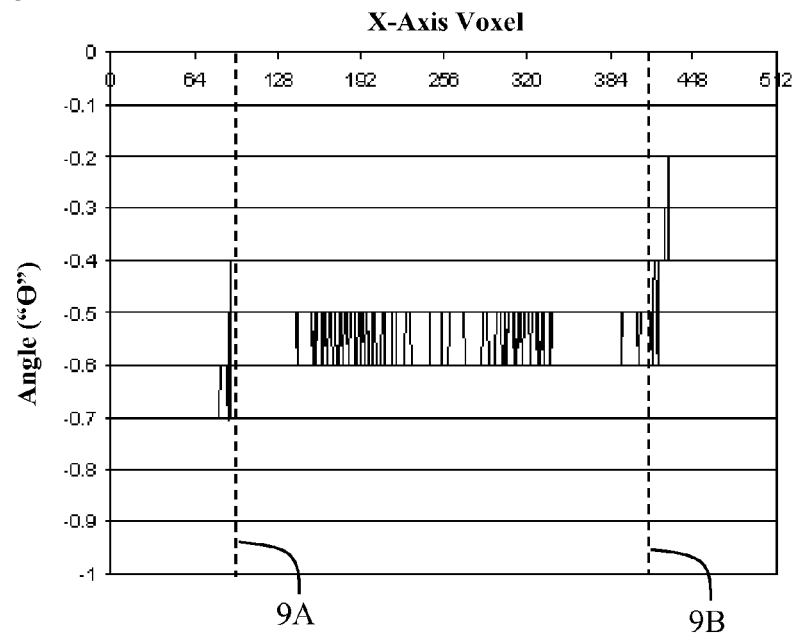
Figure 10:
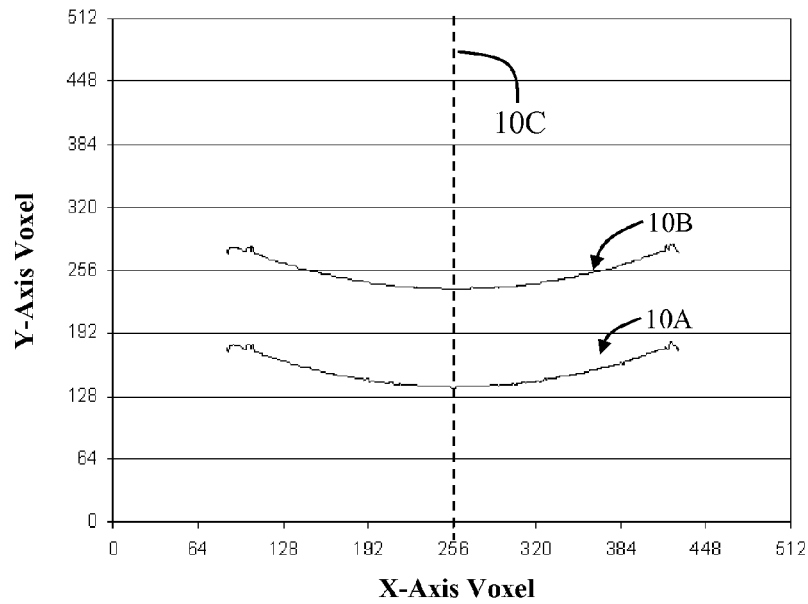
Figure 11A:
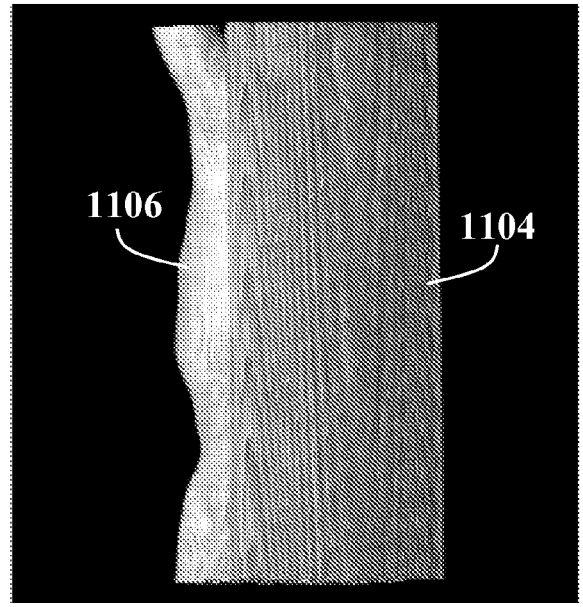
Figure 11B:
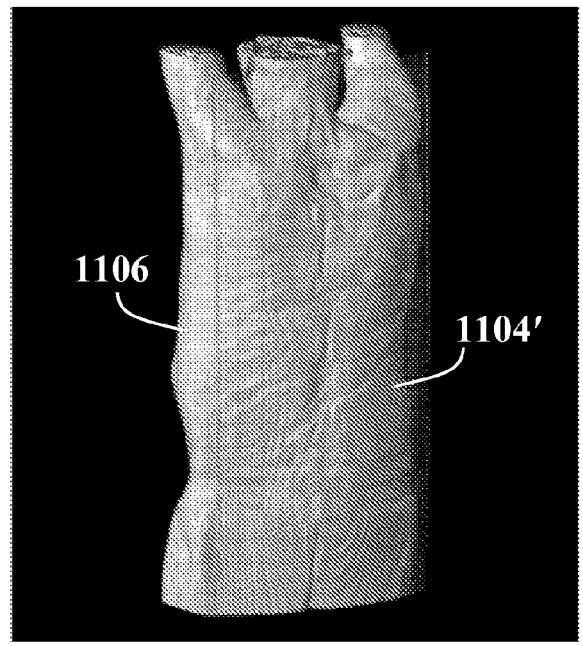
Figure 12A:
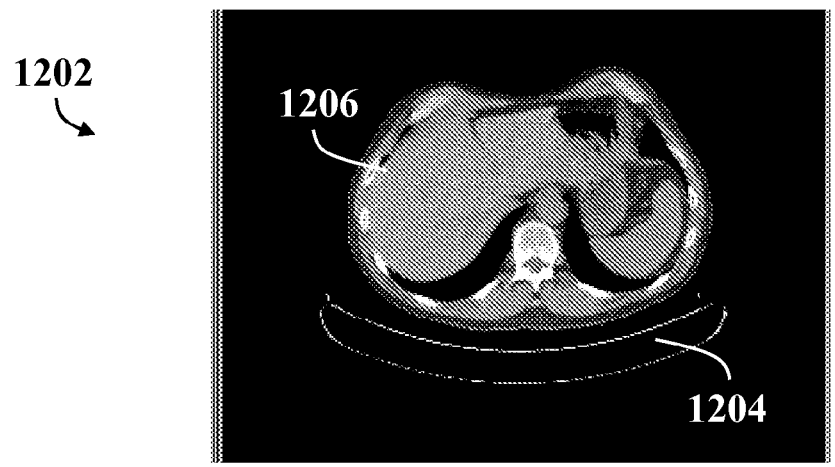
Figure 12B:
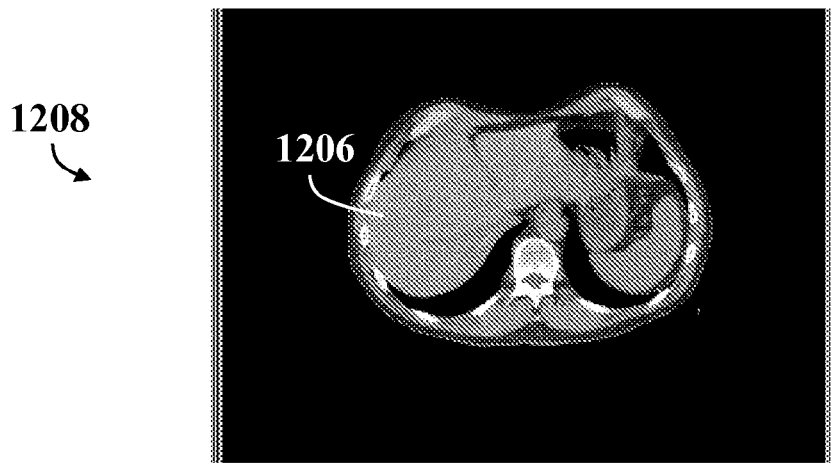
Figure 13A:
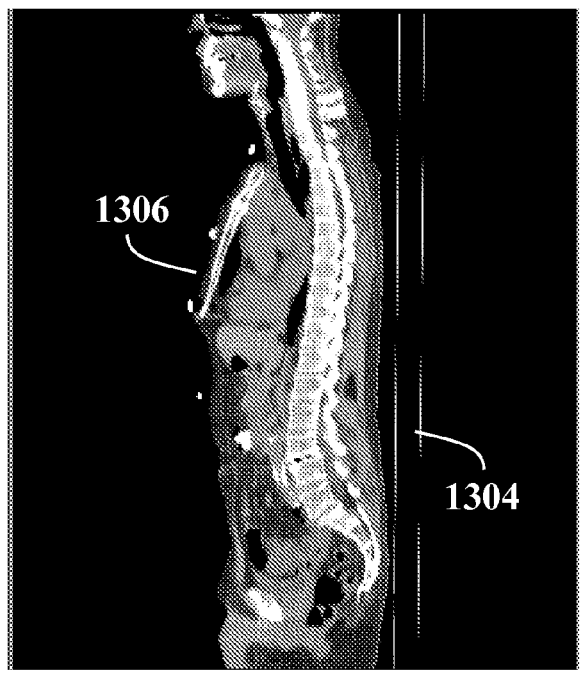

FIG. 9 graphically illustrates several object support angles θ calculated by the method 400 from a sample imaging data set;

FIG. 10 illustrates two transverse object support top surfaces, as calculated by two different methods;

FIG. 11A is an orthogonally projected CT image, including an object support;

FIG. 11B is an orthogonally projected CT image resulting from a removal of the object support from the image of FIG. 11A;

FIG. 12A is a transverse CT image, including an object support;

FIG. 12B is a transverse CT image resulting from a removal of the object support from the image of FIG. 12A;

FIG. 13A is a sagittal CT image, including an object support; and

Figure 13B:
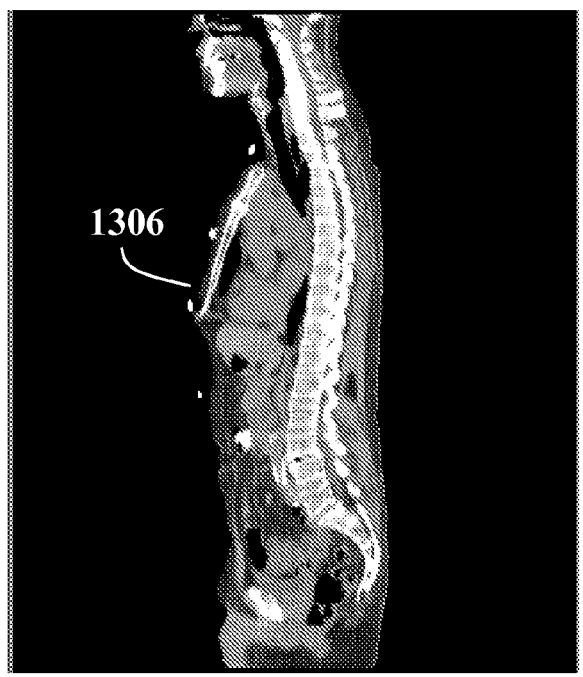

FIG. 13B is a sagittal CT image resulting from a removal of the object support from the image of FIG. 13A.

The imaging system and apparatus of the present application is generally any imaging system, for example, a CT imaging system. More specifically, with reference to FIG. 1, in an exemplary embodiment the imaging system 100 is a medical CT imaging system. A CT imaging acquisition system 102 includes a gantry 104 and an object support 106 such as a table or couch which moves along the z-axis. A patient or other object to be imaged (not shown) lies or is placed down on the object support 106 and is moved to be disposed within an aperture 108 in the gantry 104. Once the patient or object is in position within the aperture 108, an x-ray source 110 emits a projection of x-rays to be gathered by an x-ray data measurement system 112 inside the gantry 104. (A portion 114 of the gantry 104 is cut away in FIG. 1 to show the x-ray source 110 and x-ray data measurement system 112 which are housed inside the gantry 104.) The data measurement system 112 includes several photodetectors 116 disposed on a cradle 118. The x-ray source 110 and data measurement system 112 rotate together around the aperture 108 to record CT imaging data from various positions. In some embodiments such rotation may occur while the object support 106 is stationary. In other embodiments such rotation may occur in conjunction with linear movement of the object support 106 along the z-axis in a "helical" scan. The rotation is possible because the x-ray source 110 and the cradle 118 are each mounted to a common rotor (not shown) inside the gantry 104. As will be appreciated, both the object to be imaged and the object support 106 are disposed in between the x-ray source 110 and the data measurement system 112. Therefore, at least a portion of the imaging data recorded by the system 112 will include the object support 106.

The CT imaging acquisition system 102 passes the CT imaging data on to a CT imaging, processing and display system 120 through a communication link 101. Although the systems 102 and 120 are shown and described here as being separate systems for purposes of illustration, they may in other embodiments be part of a single system. The CT imaging data passes to an image processor 122 which stores the data in a memory 124. The image processor 122 electronically processes the CT imaging data to generate images of the imaged patient or other object. The image processor 122 can show the resulting images on an associated display 126. A user input 128 such as a keyboard and/or mouse device may be provided for a user to control the processor 122.

Thus the aforementioned functions can be performed as software logic. "Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory such as memory 124, part of an operating system or other type of executable instructions. It will be appreciated by one of ordinary skill in the art that the form of software is dependent on, for example, requirements of a desired application, the environment it runs on, and/or the desires of a designer/programmer or the like.

The systems and methods described herein can be implemented on a variety of platforms including, for example, networked control systems and stand-alone control systems. Additionally, the logic shown and described herein preferably resides in or on a computer readable medium such as the memory 124. Examples of different computer readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk or tape, optically readable mediums including CD-ROM and DVD-ROM, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

Figure 1:
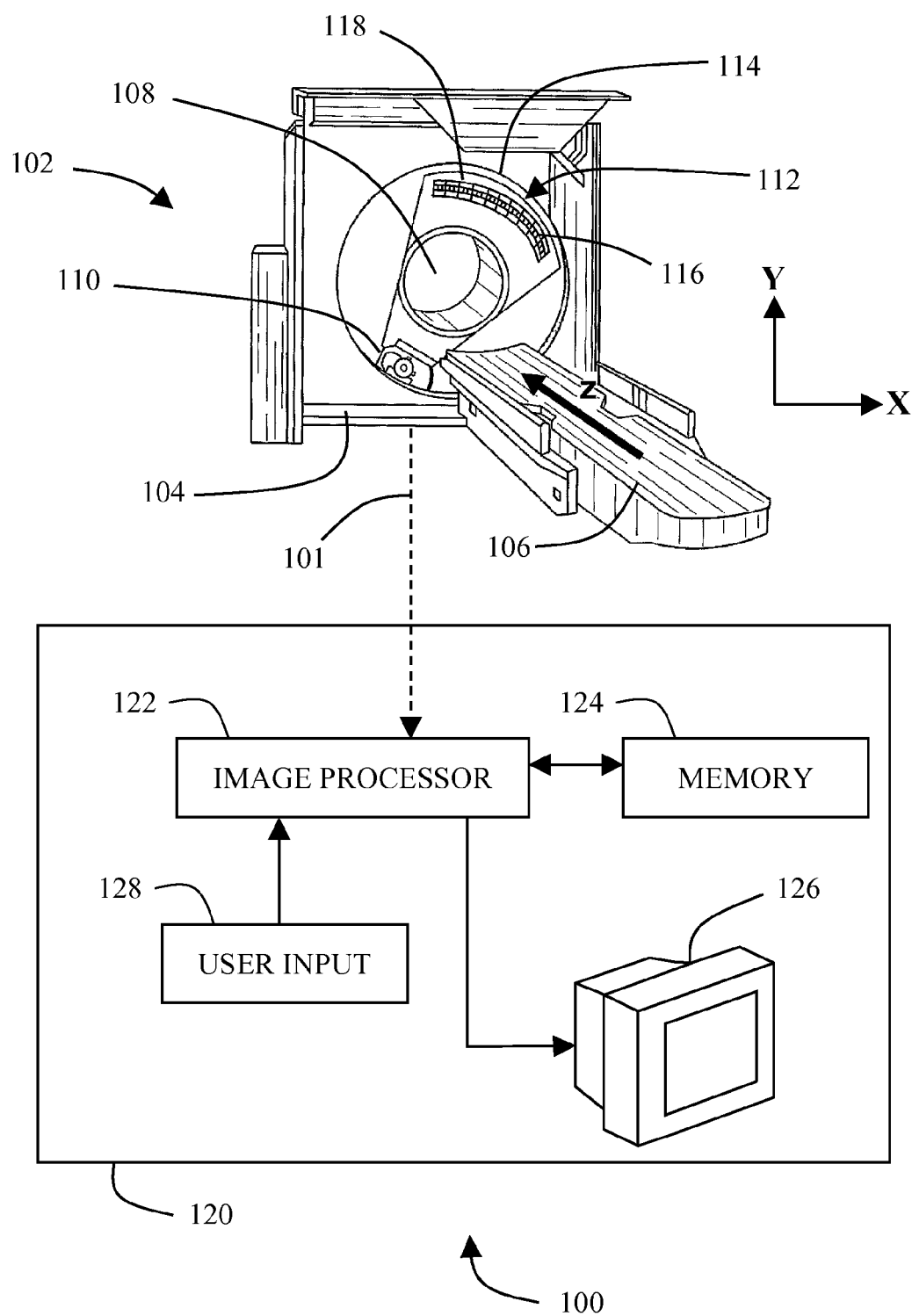
FIG. 1 is an exemplary CT imaging system, with a portion of the stationary gantry cut away to reveal the rotating gantry, x-ray source and data measurement system.

Three mutually orthogonal axes x, y and z are identified in FIG. 1. As already mentioned, the z-axis is the longitudinal axis of the gantry 104, along which the object support 106 may move the imaged object during an imaging scan. The x-axis and the y-axis then define "transverse" imaging planes which are perpendicular to the z-axis. The y-axis and the z-axis in turn define "sagittal" imaging planes which are perpendicular to the x-axis. These axes are defined herein as a patient coordinate system for the convenience of discussion only. In actual use, any coordinate systems such as a gantry coordinate system or the DICOM patient coordinate system may be employed.

The imaging system 100 may be a stand-alone unit which provides only CT-based imaging, as is shown in FIG. 1. Although not shown in the Figures, the imaging system 100 may additionally include appropriate components for PET and/or SPECT imaging, or some other kind(s) of imaging modality, in conjunction with the CT-based imaging components.

Figure 2A:
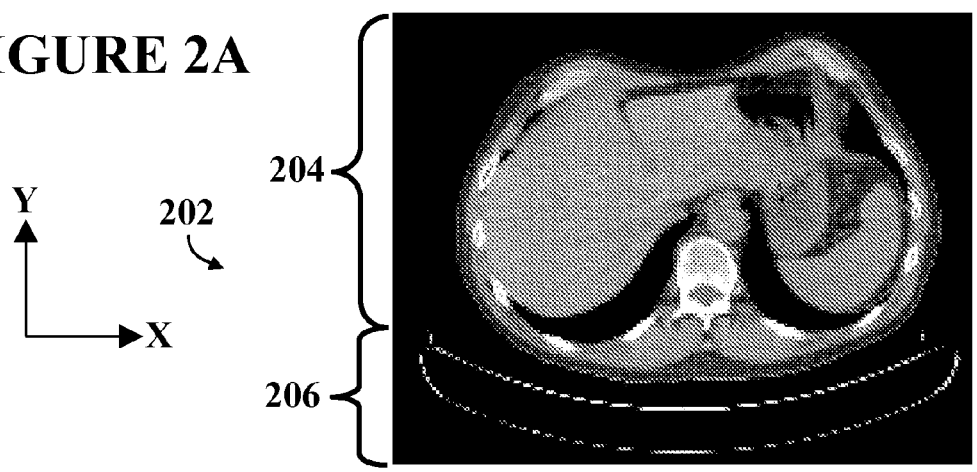
FIGS. 2A, 2B and 2C are transverse CT images of a human patient lying on an object support, taken respectively by three different hybrid PET/CT scanners each manufactured by a different company, and illustrating the different object supports being used in different scanners.
Figure 2B:
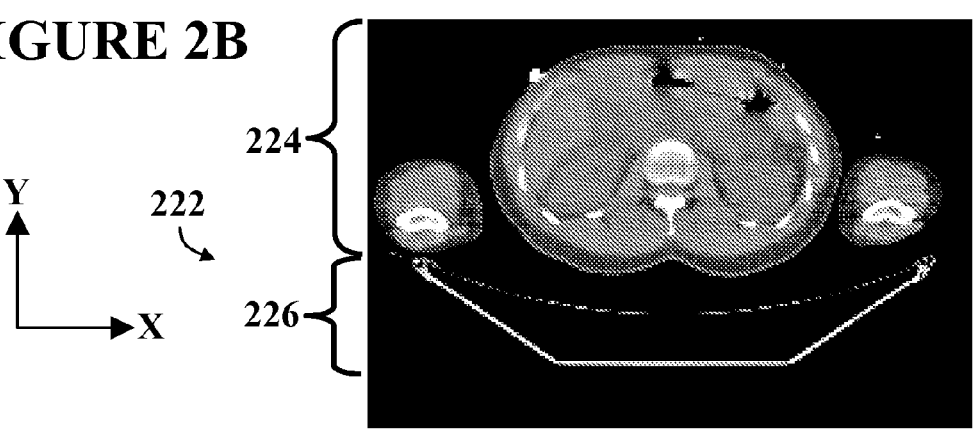
Figure 2C:
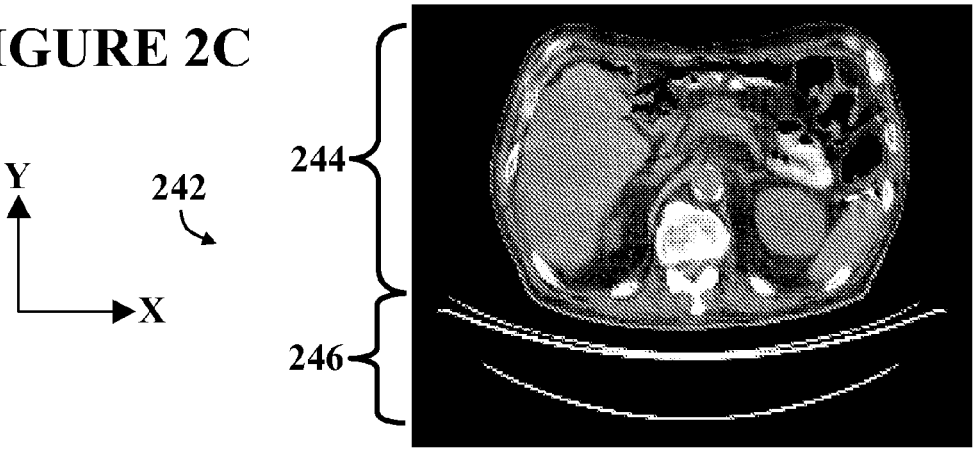

Regardless of the imaging modality employed, whether CT, SPECT, PET, or some other modality, or combinations thereof, the imaging data is typically recorded with the object to be imaged disposed on an object support such as the couch support 106. The object support 106 can have one of many different configurations, based on the particular scanner. Thus, for example, FIGS. 2A, 2B and 2C are transverse CT images taken by three different hybrid PET/CT scanners. FIG. 2A shows a transverse CT image 202 of a human patient taken by a Philips Medical hybrid PET/CT system, including a patient portion 204 and an object support portion 206. FIG. 2B shows a transverse CT image 222 of a human patient taken by a General Electric hybrid PET/CT system, including a patient portion 224 and an object support portion 226. FIG. 2C shows a transverse CT image 242 of a human patient taken by a Siemens hybrid PET/CT system, including a patient portion 244 and an object support portion 246. As can be seen by comparing these three transverse CT images, the shape and structure of the object supports 206, 226, 246 vary widely between different hybrid PET/CT systems produced by different manufacturers.

Figure 3A:
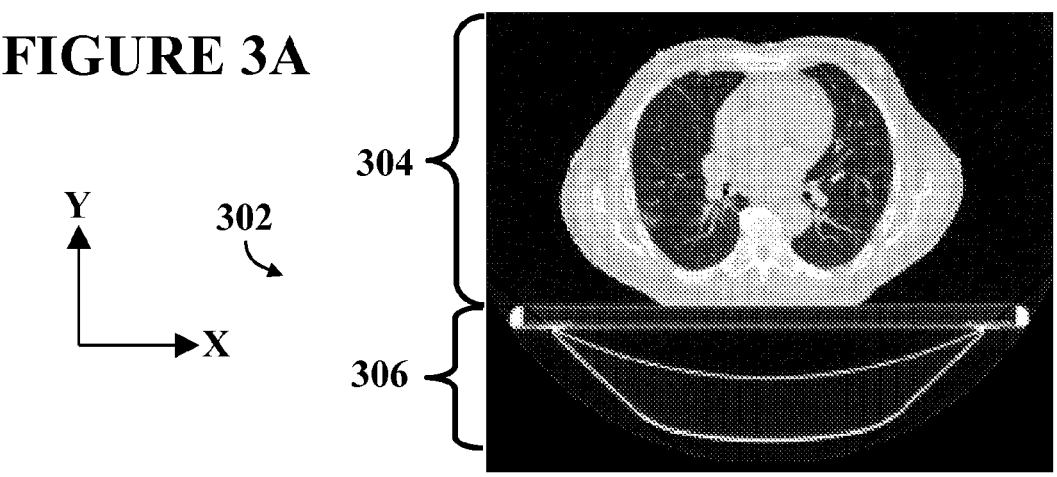
FIGS. 3A, 3B and 3C are transverse CT images of a human patient lying on an object support, taken respectively by three different CT scanners each manufactured by a different company, and illustrating the different object supports being used in different scanners.
Figure 3B:
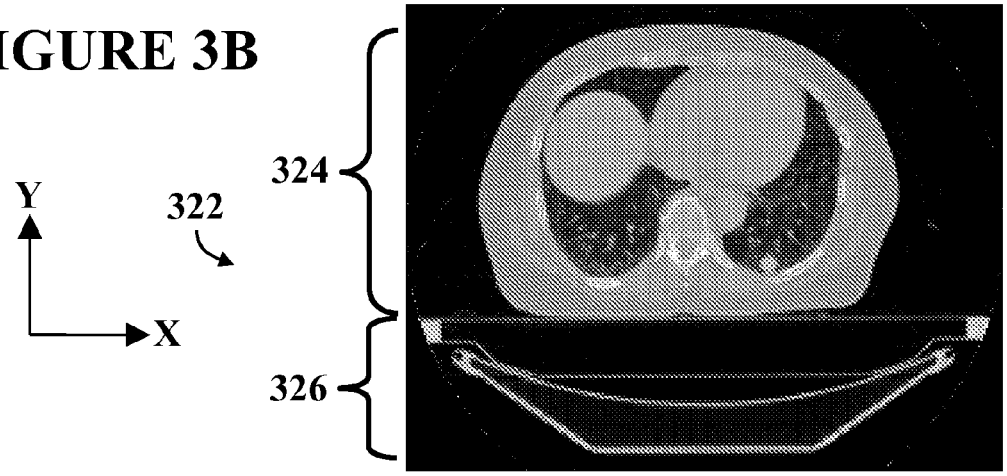
Figure 3C:
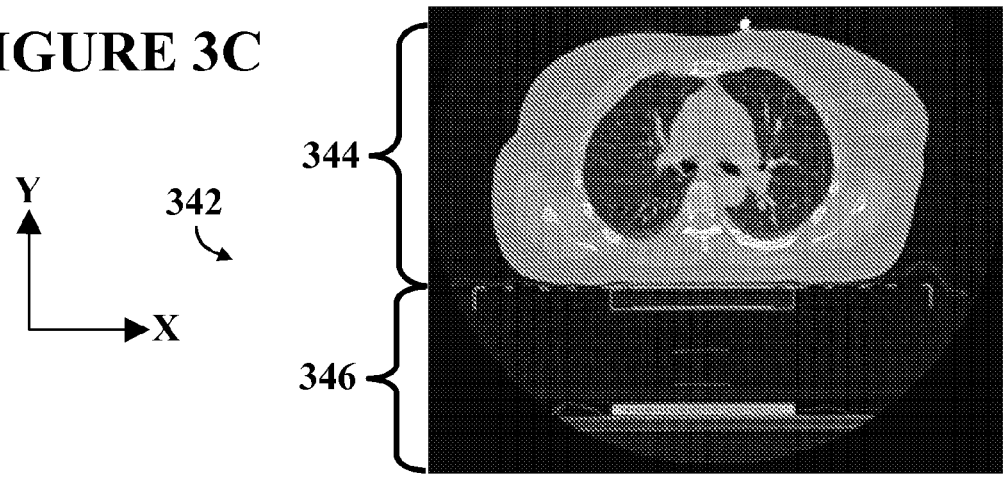

Similarly, FIGS. 3A, 3B and 3C are transverse CT images taken by three different CT scanners. FIG. 3A shows a transverse CT image 302 of a human patient taken by a Philips Medical CT system, including a patient portion 304 and an object support portion 306. FIG. 3B shows a transverse CT image 322 of a human patient taken by a General Electric CT system, including a patient portion 324 and an object support portion 326. FIG. 3C shows a transverse CT image 342 of a human patient taken by a Siemens CT system, including a patient portion 344 and an object support portion 346. As can be seen by comparing these three transverse CT images, the shape and structure of the object supports 306, 326, 346 vary widely between different CT systems produced by different manufacturers. As can also be seen by comparing FIGS. 2A through 2C with FIGS. 3A through 3C, respectively, even different imaging systems made by the same manufacturer can have object supports with widely varying shapes and structures.

There are even sources of variability in the appearance and position of an object support in images recorded by a single imaging scanner in one imaging scan. For example, the relative position or location of the object support can change along the longitudinal z-axis if the object support is not leveled well. Thus, if the image acquisition longitudinal coverage is 2 meters long, then a 0.5 degree tilt of the object support can shift the object support position in the vertical y-axis direction by as much as 18 millimeters from the first transverse imaging slice to the last transverse imaging slice.

Based on these and perhaps other problems, previously known methods for identifying an object support in transverse imaging data resort mostly to heuristics and assumptions regarding the object support shape and size, possible location, and other variables. The exemplary embodiment of the invention disclosed herein overcomes such difficulties by using sagittal view imaging data.

Figure 4:
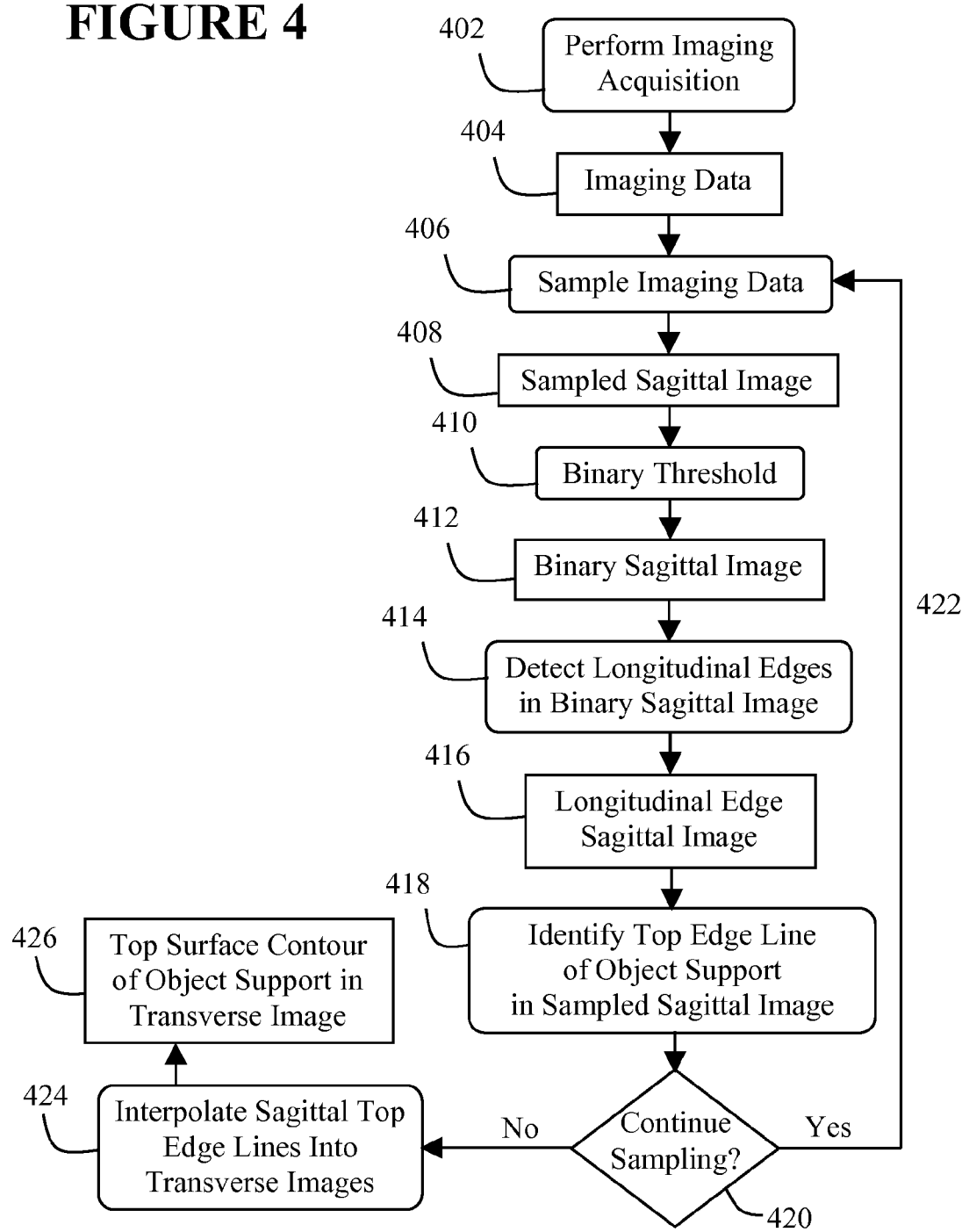
FIG. 4 illustrates an exemplary image-based method to identify and remove an object support from imaging data, in accordance with one aspect of the present invention.

Therefore, the present disclosure concerns an image-based method to identify and remove an object support from imaging data. FIG. 4 illustrates an exemplary image-based method 400 in accordance with one aspect of the present invention. In the initial step 402 of the exemplary method 400, an imaging acquisition is performed to generate imaging data 404. For example, a CT imaging system 100 may be utilized to generate volumetric CT imaging data 404.

Figure 5:
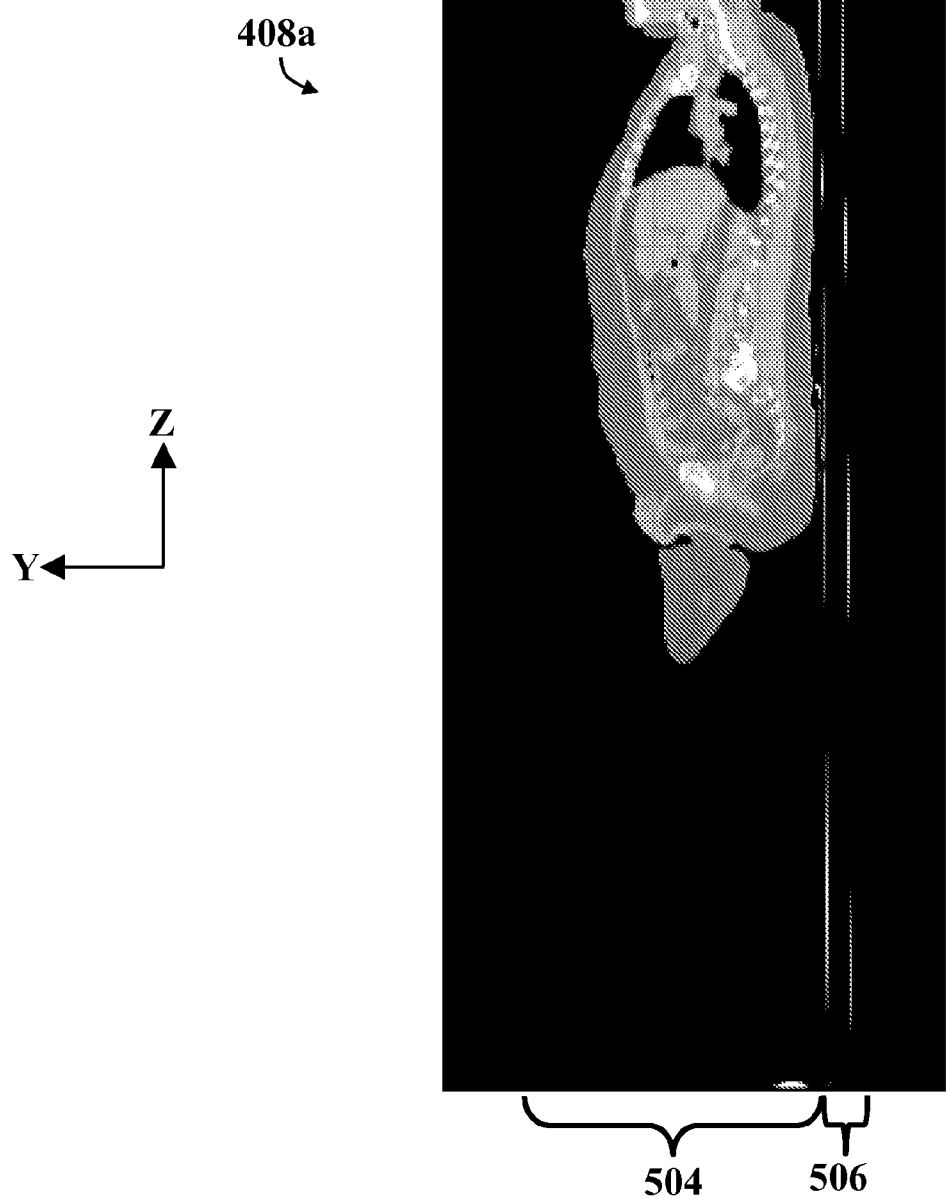
FIG. 5 is a representative sagittal CT image, including a patient portion and an object support portion.

In step 406, the imaging data 404 is sampled to generate a first sagittal image 408. FIG. 5 shows a representative sagittal CT image 408a of a human patient, including a patient portion 504 and an object support portion 506. As the image 408a illustrates, the object support portion 506 appears as a series of straight lines in the sagittal view. Indeed, this is a natural result, if a reasonable assumption is made that the transverse cross-section of the object support 506 is almost invariant along the longitudinal z-axis. These lines such as at 506 in FIG. 5 correspond to the top and bottom edges of the object support, and may also include one or more support cushions, blankets, etc.

Figure 6:
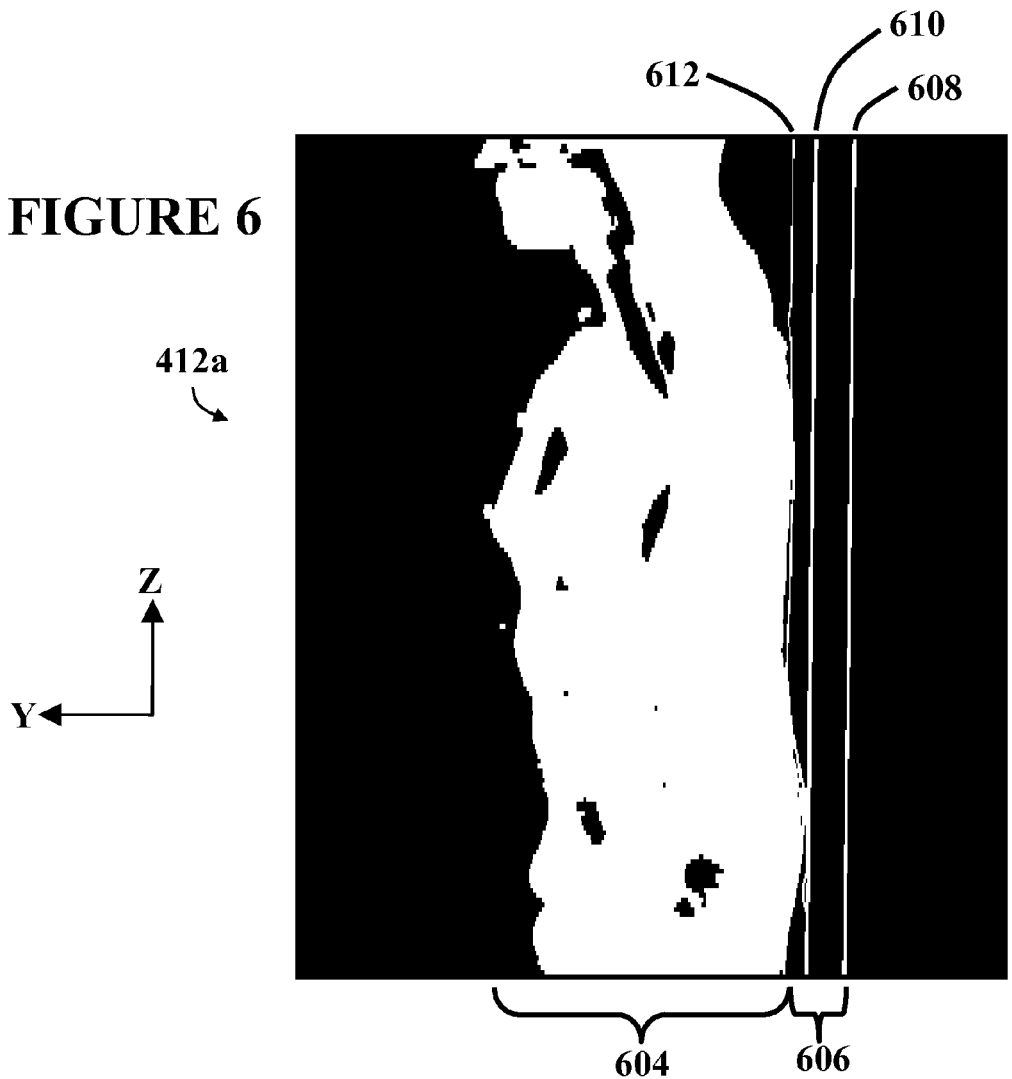
FIG. 6 is a representative binary sagittal CT image, including a patient portion and an object support portion.

In step 410, a binary threshold technique (e.g. −500 HU) is applied to the sagittal image 408 in order to generate a binary sagittal image 412. FIG. 6 shows an exemplary binary sagittal image 412a which might result from step 410 of the method 400. The exemplary binary sagittal image 412a has a patient portion 604 and an object support portion 606. The object support portion 606 of the exemplary binary image 412a comprises three different, nearly vertical lines 608, 610 and 612. As can be seen, the object support in FIG. 6 is slightly tilted, so that it is nearly vertical but not perfectly vertical in the orientation of the image 412a. The first line 608 represents the bottom edge of the object support table. The second line 610 represents the top edge of the object support table. The third line 612 represents the upper boundary of a patient support cushion on top of the object support table.

The remainder of the method 400 is substantially devoted to automatically identifying the top edge of the object support portion within the binary sagittal image 412, such as the top edge 610 of the representative object support portion 606. In step 414 of the method 400, longitudinal or nearly longitudinal edges are detected within the binary sagittal image 412. In this context, a perfectly "longitudinal" line is a line running parallel to the longitudinal or z-axis of the imaging system. Thus a longitudinal edge is an edge running parallel to the longitudinal z-axis. Sagittal view images are conventionally oriented as illustrated in FIGS. 5 and 6: with the patient's head in the upper part of the image, and the patient facing to the left. With that orientation, the longitudinal edges of the object support portion will appear as vertical or nearly vertical lines in the image, such as lines 608, 610 and 612 in FIG. 6. A relatively simple and well-known algorithm to detect vertical or nearly vertical edges is a Sobel operator, but any such algorithm may be used. The Sobel operator essentially applies a 3×3 pixel mask across the binary sagittal image 412 to identify vertical or nearly vertical edges. The result of step 414 is a longitudinal edge sagittal image 416.

Figure 7:
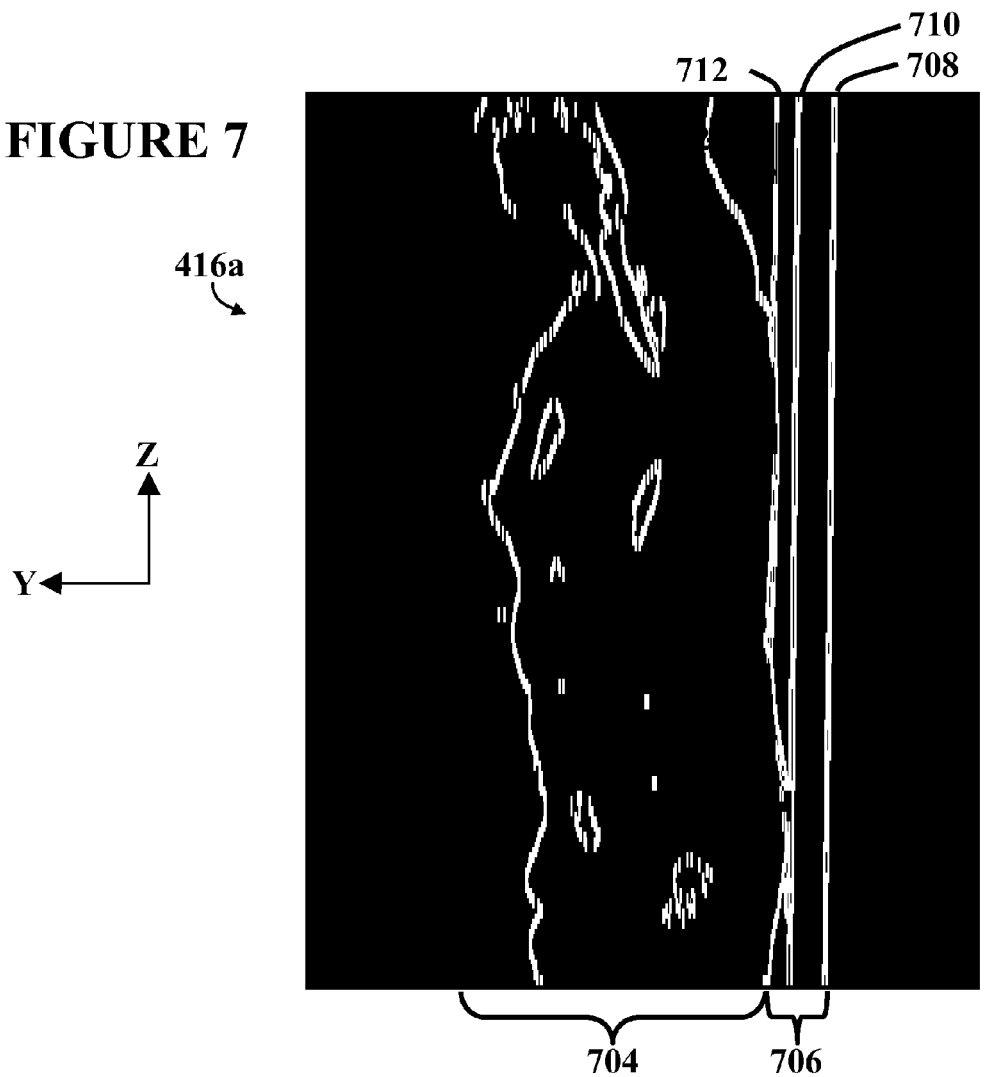
FIG. 7 is a representative longitudinal edge sagittal image, including a patient portion and an object support portion.

FIG. 7 illustrates a typical longitudinal edge sagittal image 416a. The image 416a has a patient portion 704 and an object support portion 706. As is conventional, the longitudinal lines or edges are vertical or nearly vertical in the sagittal image 416a. Thus, the three vertical lines 608, 610 and 612 which define the top and bottom edges of the object support and the patient cushion in the full binary sagittal image 602 are carried forward into the longitudinal edge sagittal image 416a as edges 708, 710 and 712 to define the object support portion 706.

After the longitudinal or nearly longitudinal edges have been identified 414, then step 418 of the method 400 identifies which one of the detected longitudinal edges in the longitudinal edge sagittal image 416 corresponds to the top edge of the object support. In this context, the "top" surface of the object support corresponds to the surface upon which the imaged object is disposed for the imaging scan. Thus, in each sagittal view, the top surface of the object support appears as a top edge. For example, in FIGS. 6 and 7, the object support top edge is line 610 or line 710. In this regard, because the object support will be nearly if not perfectly parallel to the longitudinal z-axis of the imaging system, a Hough-like transform with angle and intercept as parameters may be employed in step 418. In general, such a transform determines which combination(s) of angle and y-axis intercept values most likely correspond to the object support top edge.

More particularly, in one potential embodiment, the method step 418 may use a linear equation $y=kz+b$ to detect and identify longitudinal or nearly longitudinal lines in the sagittal view longitudinal edge image 516 which may correspond to the object support top edge. In that equation, the y-axis and the z-axis are as identified in FIGS. 6 and 7, "k" is the tangent or slope of the line tilt angle θ, and "b" is the intercept of the line along the y-axis. In this way, each potential straight line in FIG. 7 may be uniquely identified by specifying two variables: the angle and the y-axis intercept of the line. In this context, the "angle" of the line describes the degree of line tilt in the image. Thus the line "angle" may be measured as a traditional angle θ between a given axis and the line, or equivalently as a tangent or slope k of the line, or some other equivalent measure.

To simplify the processing, because the object support edge lines are almost vertical in a conventional longitudinal edge sagittal image 416, one may assume the tilt angle θ is within −1 and +1 degrees from vertical. This assumption is not, however, strictly necessary. One may further employ a step size between discrete adjacent angles of 0.1 degrees, which if the minimum and maximum angles are −1 and +1 leads to twenty-one values for θ: (−1°, −0.9°, . . . , 0.9°, 1°), and equivalently twenty-one values for k. More general applications involving any minimum, maximum range and step values for angle measurements are, of course, also possible.

In a typical imaging application, transverse imaging views are composed of a 512 by 512 pixel array. In that typical scenario 0≤b≤511. More general applications involving any size of pixel array are, of course, also possible.

Due to the binary threshold step 410, each pixel in the longitudinal edge sagittal image 416 is either white or black; there are no shades of gray in the binary image 416. A two-dimensional histogram may be generated to automatically look for white lines in the longitudinal edge sagittal image 416 which are long enough to be part of the object support portion. The two dimensions of the histogram correspond to the angle values and the y-axis intercept values which define the straight lines in the longitudinal edge sagittal image 416. For each pair of such values, the histogram bin records how many pixels along the defined line in the longitudinal edge sagittal image 416 are white. Thus, the highest count histogram bins correspond to the longest connected lines in the longitudinal edge sagittal image 416.

Figure 8:
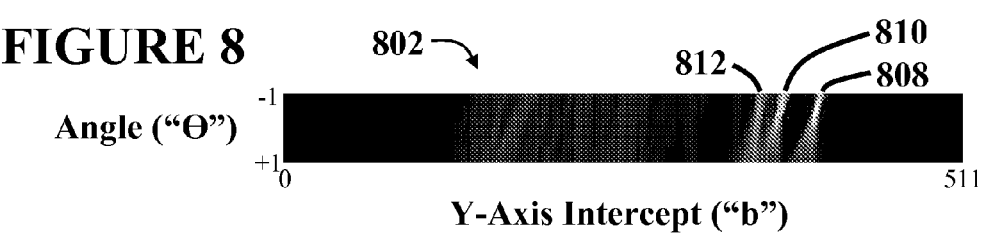
FIG. 8 is a graphical representation of a histogram which may be used to find the top edge of the object support portion in FIG. 7.

A graphical representation 800 of such a histogram is shown in FIG. 8. In the graphical representation 800, the horizontal axis corresponds to the y-intercept values b (0 through 511) from FIG. 7. The vertical axis corresponds to the tilt angles θ in FIG. 7 (limited here for the sake of convenience to angles θ of −1 through 1 degrees from vertical, or equivalently 89 through 91 degrees from horizontal). The brightness of each cell in the graphical histogram 800 represents the histogram bin count for the line defined by the y-axis intercept b and tilt angle value θ corresponding to the histogram cell.

The row in the histogram with the highest total histogram bin count in the row is identified. The angle value θ which corresponds to that row is taken as the angle of the object support in the sampled sagittal image 408. In the representative example of FIG. 8, the row angle θ with the highest total histogram bin count is −0.6 degrees. Next, the cell(s) within that row which have the highest histogram bin count value in the cell(s) are identified. These cells represent the list of potential y-axis intercept candidates b which, together with the already-set tilt angle θ, may define a longitudinal or near longitudinal line which is part of the object support in the image 416. The positions of the y-axis intercept candidates b are determined automatically. This may be accomplished, for example, by scanning histogram bin counts in the row and identifying the center of a line segment on which all histogram bin counts are greater than a chosen threshold. The threshold might for example be set equal to half of the number of transverse imaging slices in the imaging data 404. That threshold can be appropriate because a structure that appears on at least half of the transverse imaging slices is very likely part of the object support. Once the y-axis intercept candidates b are identified, they may be further merged if they are too close to each other. The largest distance between two y-axis intercept candidates b to be merged may be equal to about 5 millimeters, for example. The top edge of the object support in the longitudinal edge sagittal image 416 will then be taken as the straight line with the determined angle θ and one of the identified y-axis intercept candidates b.

Depending on the actual design of the object support, multiple y-axis intercept candidates b may be identified. For example, in the representative example of FIGS. 7 and 8, there are three y-axis intercept candidates. These three candidates correspond to the three parallel lines 708, 710 and 712 in FIG. 7. The method 400 may automatically determine which candidate line corresponds to the object support top edge. This can be complicated because in some instances (such as for example FIG. 7) the object support cushion will form a long enough line to be identified in step 418, while in other instances it is too short to be identified in step 418.

Many criteria might be used to identify which one of multiple longitudinal edges corresponds to the top edge of the object support. As one example, the y-axis distance between two candidate lines may be used. If that distance is large, the candidate line which is nearer to the centerline is the object support top edge. If that distance is small, such as in FIG. 7, then the candidate line with the longer length is chosen instead. The length of a candidate line corresponds to the histogram bin count total in the longest series of adjacent pixels within the image 416 along the candidate line. The object support top edge tends to be longer than the cushion, because the cushion is not always a straight line.

Based on whether an imaged patient is in the supine or prone position, the search for candidate lines may be limited to one side of the image 416. The above descriptions are applicable to the supine case, in which the patient is facing upwardly away from the object support. For the prone case, in which the patient is facing downwardly toward the object support, sagittal views such as in FIGS. 5, 6 and 7 are conventionally oriented with the object support located in the left side of the image. In other words, it is conventional that sagittal images of supine patients and of prone patients are oriented so that the patient is facing to the left-hand side in the image in both cases. This may need to be taken into account when implementing step 418 to identify the top edge of the object support.

Upon completion of step 418, a longitudinal or near longitudinal line in the longitudinal edge sagittal image 416 has been identified as the top edge of the object support. The angle and y-axis intercept values defining that line are then taken as the top edge of the object support in the y,z-axis plane of the originally sampled sagittal image 408. In the next step 420, a determination is made whether a sufficient number of sagittal images 408 have been sampled in order to define the top surface of the object support in the transverse imaging planes of interest. For example, as discussed further below, all sagittal planes passing through the object support may be sampled. If sampling needs to continue 422, then another sagittal image 408 is sampled 406 from the imaging data 404. The succeeding method 400 steps 410-418 are then applied to that second sagittal image 408 to identify the top edge of the object support in the y,z-axis plane corresponding to the second sagittal image 408. This re-sampling 422 may, in some embodiments, employ the already determined object support top edges in prior sagittal images 408 to help determine the object support top edges in later sagittal images 408. For example, the search for candidate lines may be limited to areas in close proximity to the already determined top edges. The re-sampling 422 continues until the top edge of the object support has been identified in a sufficient number of sagittal images 408 to define the top surface of the object support in the transverse planes of interest.

As just discussed, when performing the re-sampling 422, the top edge of the object support may be identified in a particular sagittal image 408 relying solely on the image content in that particular sagittal image 408 by applying steps 410-418. In an alternative embodiment, the object support angle generated in the first sampled sagittal image 408 may simply be re-used to define the top edge in each subsequently sampled sagittal image 408. This alternative approach may in some cases reduce the processing time and/or reduce errors. One would expect the two approaches to give comparable results.

That expectation is confirmed in the data shown in FIGS. 9 and 10, which were generated using a sample set of CT imaging data 404. In FIG. 9, the horizontal axis lists the sagittal position values (0 through 511) in the data, corresponding to 512 individual sagittal y,z-axis planes. The vertical axis in FIG. 9 plots the object support tilt angle θ calculated for each sagittal position, applying the method steps 410-418 to the sagittal image 408 corresponding to that sagittal position. The various lines in FIG. 9 indicate where the calculated values for θ changed from one sagittal position to an adjacent sagittal position. As can be seen, the angle θ was consistently determined to be either −0.5° or −0.6° for the vast majority of the sagittal y,z-axis positions, those corresponding to sagittal positions between lines 9A and 9B. It is not until reaching the left and right boundaries of the object support, sagittal positions below line 9A or above line 9B, where the angle values θ begin to fluctuate more dramatically due to error or noise. Over the vast majority of the object support's extent along the x-axis, the determined angle is stable at either −0.5° or −0.6° among the various y,z-axis sagittal positions.

FIG. 10 illustrates two calculated top surface contours 10A and 10B of an object support, in a transverse x,y-axis plane. The first calculated top surface contour 10A was determined by individually calculating an object support angle for each sagittal image slice 408 by applying steps 410-418 to each sagittal image slice 408. The second calculated top surface contour 10B, by contrast, was determined by calculating an object support angle only for the mid-sagittal slice 10C by applying steps 410-418, and then using that calculated angle for all the remainder of the sagittal image slices 408. The second calculated top surface contour 10B has been shifted upwards along the y-axis in FIG. 10 for better illustration and comparison with the first calculated top surface 10A. As illustrated in FIG. 10, the top surface contours 10A and 10B have been flipped for display purposes. Thus, exact positions are the difference between 512 and the readouts from the vertical axis of FIG. 10. The detected top surface contours 10A and 10B using the two approaches are strikingly similar.

Yet other alternatives for determining a common object support angle θ or slope k to be applied in many different sagittal images 408 are of course possible. For example, steps 410-418 may be applied to multiple sampled sagittal images 408 to generate multiple angles θ based solely on the respective image contents, and then averaging those values to be applied in all sagittal images.

In one convenient embodiment which is particularly useful in a CT imaging apparatus such as the CT system 100, the first sampled sagittal image 408 corresponds to the mid-sagittal plane. The mid-sagittal plane is the sagittal y,z-axis plane which passes through the center of the imaging aperture 108. To generate a complete description of the top surface of the object support, the re-sampling 422 first proceeds in a stepwise fashion along the x-axis outwardly from the mid-sagittal plane in one direction. When step 414 fails to detect any longitudinal edges, the outer edge of the object support has been reached and the re-sampling 422 in that direction stops. Then the re-sampling next proceeds in a step-wise fashion along the x-axis outwardly from the mid-sagittal plane in the opposite direction. When step 414 again fails to detect any longitudinal edges, the opposite outer edge of the object support has been reached and the re-sampling 422 completely stops.

Once enough imaging data 404 has been sampled 406 and 422, then at step 424 the various lines defining the top edge of the object support in several sagittal y,z-axis planes are interpolated 424 into one or more transverse x,y-axis images of interest. That is, the top edge line determined for a particular sagittal y,z-axis plane passes through a given transverse x,y-axis plane at a particular point X,Y in that plane. The interpolation step 424 determines the collection of such points X,Y in a particular transverse x,y-axis plane. That collection defines the top surface contour 426 of the object support in the transverse x,y-axis plane, such as shown for example in FIG. 10 discussed further below. This interpolation 424 may be accomplished by simply generating a three-dimensional top surface contour which passes through multiple transverse x,y-axis planes. It might also be accomplished on a plane by plane basis. After the top surface contour 426 is formed in a particular transverse image, the collection of points X,Y can be further low-pass filtered to reduce noise. A small buffer can be introduced in the y-axis direction to ensure the top surface contour of the object support is removed entirely; in most cases it is unlikely that a loss of data a few pixels above the actual object support top would materially impact the usefulness of the image. The two outer boundaries of the object support may then optionally be extended in both directions by padding the boundaries.

Once the top surface contour 426 of the object support has been identified in one transverse x,y-axis plane, the interpolation step 424 may be repeated in more transverse x,y-axis planes to generate a top surface contour 426 in those planes. In an alternative embodiment, the initial top surface contour 426 of the first transverse x,y-axis plane may be extended into one or more additional transverse x,y-axis planes. This extension may, for example, use the determined tile angle θ or slope k and the distance between the two transverse planes to simply shift the contour 426 into the second transverse plane. This alternative embodiment might conveniently employ the interpolation step 424 to set a contour 426 in the most superior transverse plane of interest, and then extend that surface to adjacent transverse planes down the z-axis in a step-wise fashion until the most inferior transverse plan of interest is reached.

Once the top surface contour 426 has been set in each transverse x,y-axis plane of interest, then the pixels below the top surface contour 426 in each such plane are simply replaced with air to remove the object support from the imaging data. Of course, if the sagittal y,z-axis planes are of interest, the same process can remove the object support from the sagittal imaging planes by removing pixels below the top edge of the object support in each sagittal imaging plane of interest. Also, instead of removing data, the original imaging data 404 may be re-sampled in a volume rendering or other rendering, with the re-sampling limited to imaging data 404 located above the top surface contour 426. As the position information of the object support is available, one can also insert a digital object support into the image data to replace the excised data. Inserting a digital object support is particularly useful in radiation treatment planning, as discussed above.

In the embodiments described above, the sagittal y,z-axis planes for all x-axis pixel values are processed to determine a top edge line for the object support in each sagittal plane. For performance reasons, the sagittal planes can optionally be more sparsely sampled, such as every fourth x-axis pixel value. To have dense sampling close to the left and right object support boundaries, as soon as one such sparse sampling position does not detect a longitudinal edge in step 414, it can backtrack to the immediately previous sparse sampling position and do dense sampling from that point onward along the x-axis. The missing object support top edges at un-sampled x-axis positions can be estimated using any appropriate interpolation or curve fitting method, such as bicubic, high-order polynomials, spline, or many others. Even simpler alternatives include repeating the same X,Y values from an adjacent sagittal y,z-axis plane.

FIGS. 11 through 13 illustrate several CT images before and after object support removal. These CT images were each acquired using a Philips Medical hybrid PET/CT imaging system. FIG. 11A is an orthogonally CT image 1102 of an object support 1104 underneath a human subject 1106, from the viewpoint of an observer standing underneath and somewhat to the side of the object support 1104. FIG. 11B is a projected CT image 1108 resulting from a removal of the object support 1104 from the image 1102. There is still a vestige 1104' of the object support remaining in the image 1108. Applying a buffer as discussed above can remove the vestige 1104'. FIGS. 11A-11B particularly illustrate an example wherein removing an object support from imaging data is useful to obtain a complete three-dimensional view of the imaged object.

FIG. 12A is a transverse CT image 1202 of an object support 1204 underneath a human subject 1206. FIG. 12B is a transverse CT image 1208 resulting from removal of the object support 1204 from the image 1202.

FIG. 13A is a sagittal CT image 1302 of an object support 1304 underneath a human subject 1306. FIG. 13B is a sagittal CT image 1308 resulting from removal of the object support 1304 from the image 1302.

In the preferred embodiment and examples described above, the top surface of the object support is assumed to appear as a single, straight line in each sagittal y,z-axis plane of the imaging data. While that is a very common situation, it is not the only situation in which the present method may be advantageously used. For example, in some situations the object support is a two-piece couch wherein one piece may tilt up and down to form various angles with respect to the other piece. In this way, a patient may be sitting in an inclined position during the imaging process. If the only part(s) of the patient to be imaged lie on one side of the object support tilt, the description above directly applies, using the longitudinal axis of that object support portion. If on the other hand the part(s) of the patient to be imaged lie on both sides of the object support tilt, then the object support will appear as two straight lines in each sagittal y,z-axis plane of the imaging data. The present method can be used in that situation by detecting all lines in the binary sagittal image, and changing the search angles for piecewise linear portions of the object support. To enhance this process, the method may take into account the specific angle between the two portions of the object support in order to more efficiently identify the top edges of the object support in the sagittal imaging planes.

An additional benefit of the method described herein is that it may be used as a quality assurance tool to signal when object support leveling may be required. That is, the present method in various embodiments determines the sloping angle of the object support in an imaging apparatus. In most situations, the object support is ideally level, with a sloping angle of zero degrees. If the sloping angle exceeds pre-set thresholds, then the CT system may notify a user that the object support should be made more level in order to reduce the sloping angle.

The invention has been described with reference to the preferred embodiments. Obviously, modifications and alterations will occur to others upon reading and understanding the preceding detailed description. For example, the steps as shown in FIG. 4 may be re-arranged in order, or may be modified by adding or removing certain steps, or modifying certain steps. Thus, the initial step may be to apply a binary threshold to the entire volume of imagining data, and then sampling sagittal view data from the binary volume data to generate a binary sagittal image 412. It is intended that the invention be construed as including all such modifications and alterations insofar as they come within the scope of the appended claims or the equivalents thereof. The invention may take form in various compositions, components and arrangements, combinations and sub-combinations of the elements of the disclosed embodiments.

The invention claimed is:

1. A computer-implemented method for processing imaging data using an image processor, comprising the steps of:
    sampling the imaging data to generate selected sagittal images, wherein each one of the selected sagittal images comprises an object portion and an object support portion;
    identifying a top edge of the object support portion in each one of the selected sagittal images; and
    interpolating each of the top edges into at least a first transverse plane of imaging data to form a top surface contour of the object support in the first transverse plane of imaging data.

2. The method of claim 1, wherein the top edge identification step further comprises, for at least one of the selected sagittal images:
    applying a binary threshold to convert the at least one selected sagittal image into a binary sagittal image;

detecting edges within the binary sagittal image to generate an edge sagittal image comprising one or more edges; and identifying one of the edges in the edge sagittal image as the top edge of the object support portion in the at least one selected sagittal image.

3. The method of claim 2, wherein the detected edges are longitudinal or nearly longitudinal edges.

4. The method of claim 3, wherein the binary sagittal image is conventionally oriented so that the detected edges are vertical or nearly vertical in the binary sagittal image, and further wherein a mask is applied across the binary sagittal image in the edge detection step.

5. The method of claim 1, wherein the top edge identification step employs a transform comprising angle and axis intercept values as variables to identify the top edge of the object support portion in at least one of the selected sagittal images.

6. The method of claim 5, wherein the angle values are constricted between a minimum angle value and a maximum angle value when applying the transform.

7. The method of claim 5, wherein the transform further comprises identifying one or more edges in an edge sagittal image corresponding to the at least one selected sagittal image which are long enough to be part of the object support portion.

8. The method of claim 5, wherein a single angle value is determined based on one of the selected sagittal images, and then the single angle value is re-applied in the other selected sagittal images to determine the top edge of the object support portion in the other selected sagittal images.

9. The method of claim 5, wherein the angle value is further utilized to determine whether the object support should be made more level.

10. The method of claim 1, wherein the top edge identification step further comprises firstly identifying multiple candidate edges as the top edge of the object support portion in at least one of the selected sagittal images, and secondly automatically evaluating the multiple candidate edges to determine which one of the candidate edges is the top edge of the object support portion in the at least one selected sagittal image.

11. The method of claim 1, wherein the sampling step and the top edge identification step are first applied to a mid-sagittal plane of imaging data, and then are subsequently applied in a step-wise fashion in further selected sagittal planes of imaging data extending outwardly from the mid-sagittal plane in each direction.

12. The method of claim 1, further comprising the step of introducing a buffer to the top surface contour to ensure that the object support is entirely removed.

13. The method of claim 1, further comprising a second sampling of the imaging data to generate an image without the object support, wherein the second sampling is limited to imaging data above the top surface contour.

14. The method of claim 13, wherein the second sampling is a volume rendering of the imaging data.

15. The method of claim 1, further comprising removing imaging data which is below the top surface contour from the first transverse plane of imaging data.

16. The method of claim 1, further comprising applying the top surface contour in a first transverse plane of imaging data to one or more other transverse imaging planes.

17. The method of claim 16, further comprising use of an object support angle value in order to apply the top surface contour in the first transverse plane of imaging data to the one or more other transverse imaging planes.

18. The method of claim 1, further comprising the step of inserting a digital object support into the first transverse plane of imaging data.

19. The method of claim 1, wherein the interpolating step comprises estimating portions of the top surface contour by interpolating or curve fitting those estimated portions based on the interpolation of the top edges into the first transverse plane of imaging data.

20. The method of claim 1, further comprising applying a binary threshold to the imaging data before sampling the imaging data to generate the selected sagittal images.

21. A system for processing imaging data, the system comprising an image processor that comprises logic to:
sample the imaging data to generate selected sagittal images, wherein each one of the selected sagittal images comprises an object portion and an object support portion;
identify a top edge of the object support portion in each one of the selected sagittal images; and
interpolate each of the top edges of the object support portion into at least a first transverse plane of imaging data to form a top surface contour of the object support in the first transverse plane of imaging data.

22. The system of claim 21, wherein the system further comprises logic to identify the top edge in at least one selected sagittal image by:
applying a binary threshold to convert the at least one selected sagittal image into a binary sagittal image;
detecting edges within the binary sagittal image to generate an edge sagittal image comprising one or more edges; and
identifying one of the edges in the edge sagittal image as the top edge of the object support portion in the at least one selected sagittal image.

23. The system of claim 21, wherein the system further comprises logic to identify the top edge in each selected sagittal image by employing a transform comprising angle and axis intercept values in at least one of the selected sagittal images.

24. The system of claim 23, wherein a single angle value is determined based on one of the selected sagittal images, and then the single angle value is re-applied in the other selected sagittal images to determine the top edge of the object support portion in the other selected sagittal images.

25. The system of claim 21, wherein the system further comprises logic to apply the top surface contour in the first transverse plane of imaging data to one or more other transverse imaging planes.

26. The system of claim 21, wherein the system further comprises logic to estimate portions of the top surface contour by interpolating or curve fitting those estimated portions based on the interpolation of the top edges into the first transverse plane of imaging data.

27. A software product stored on a non-transitory computer-readable medium for removing an object support from imaging data, the software product comprising logic to:
sample the imaging data to generate selected sagittal images, wherein each one of the selected sagittal images comprises an object portion and an object support portion;
identify a top edge of the object support portion in each one of the selected sagittal images; and
interpolate each of the top edges of the object support portion into at least a first transverse plane of imaging data to form a top surface contour of the object support in the first transverse plane of imaging data.

* * * * *